United States Patent [19]

Schlesinger

[11] Patent Number: 4,640,580

[45] Date of Patent: Feb. 3, 1987

[54] OPTICAL CHOPPER WITH HIGH RATE OF FOCUS DITHER

[75] Inventor: Eugene R. Schlesinger, Wilton, Conn.

[73] Assignee: The Perkin-Elmer Corporation, Norwalk, Conn.

[21] Appl. No.: 630,459

[22] Filed: Jul. 13, 1984

Related U.S. Application Data

[63] Continuation of Ser. No. 345,860, Feb. 4, 1982, abandoned.

[51] Int. Cl.⁴ .............................................. G02B 26/02
[52] U.S. Cl. ..................................... 350/274; 350/272
[58] Field of Search ................. 350/272, 274, 276 SL, 350/152; 356/152

[56] References Cited

U.S. PATENT DOCUMENTS 3,435,213  3/1969  Colbow et al. ...................... 350/274

Primary Examiner—John K. Corbin
Assistant Examiner—P. M. Dzierzynski
Attorney, Agent, or Firm—Thomas P. Murphy; Edwin T. Grimes; Francis L. Masselle

[57] ABSTRACT

In an optical system with an optical axis in which an image is to be focused at an image plane, an improved chopper which can be driven at a high rate for obtaining dither about the focal point in the system includes first and second chopper blades, each having at least one notch in their periphery, the chopper blades mounted to a common shaft adapted for rotation, parallel to each other and essentially perpendicular to the optical axis and on opposite side of the image plane, the outputs of one of the blades will representing an ahead of focus edge response and the other of said blades a behind focus edge response which can be sensed and processed to carry out correction of the optical system.

6 Claims, 13 Drawing Figures

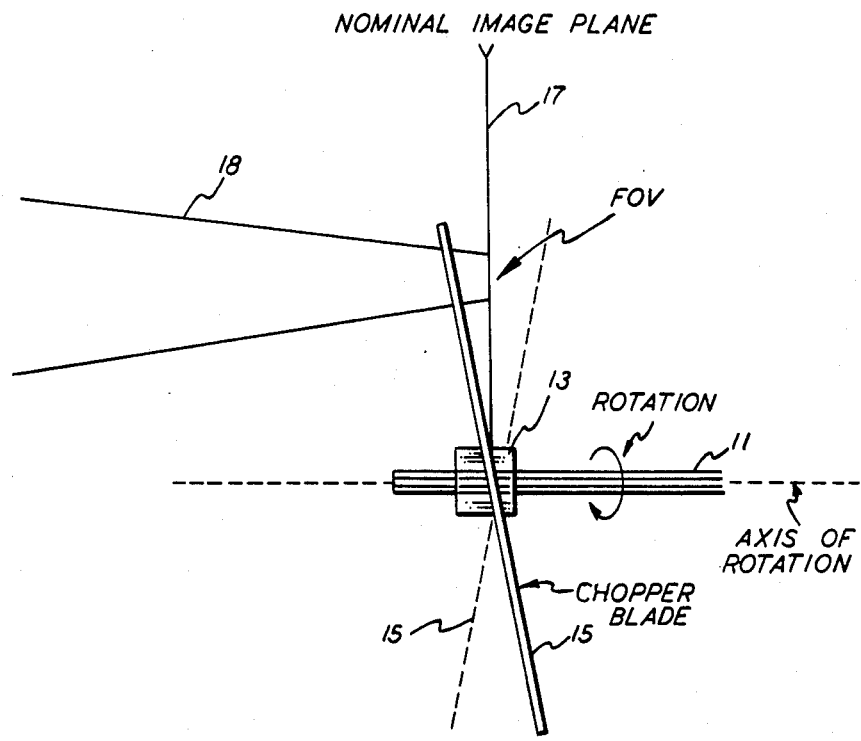
FIG. 1
Prior Art
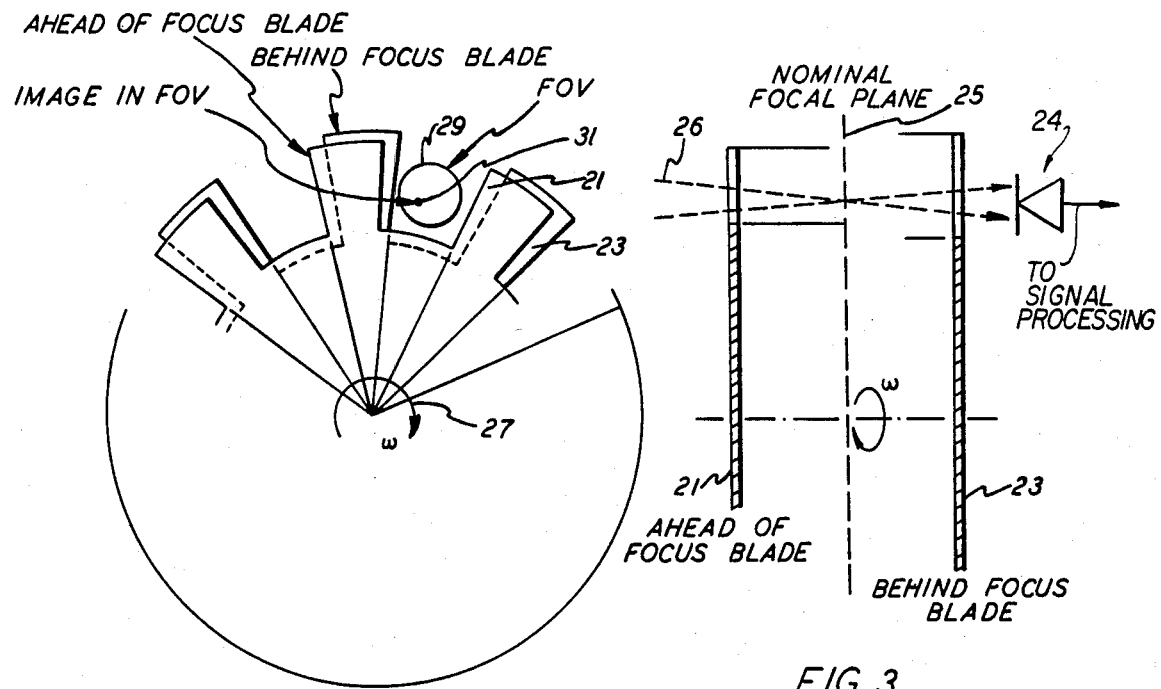
FIG. 2
FIG. 3

$A_s = (V_2 - V_1) - (V_2' - V_1')$

OPTICAL CHOPPER WITH HIGH RATE OF FOCUS DITHER

This application is a continuation of application Ser. No. 345,860, filed Feb. 4, 1982, now abandoned.

BACKGROUND OF THE INVENTION

This invention relates to optical systems in general and, more particularly, to an optical chopper with a high rate of focus dither.

Optical instruments employing optical choppers at their nominal focal, or image, planes often utilize a focus dither. Such dither can be introduced by several means including an intentional axial motion on some optical element in the optical train ahead of focus. Another technique for achieving similar results is the use of a chopper blade whose axis is not parallel to the axis of rotation. In such a scheme, the rotational axis is parallel to the instrument's optical axis and the field of view coincides with the area near the edge of the chopper. Chopper rotation then causes the blade to intercept the optical path at a sinusoidally varying position with respect to nominal focus. Such as system is depicted in FIG. 1. In this and other systems, an appropriate sensor is disposed at a point behind the blade and the output thereof, which is, thus, modulated at the chopper frequency, is utilized for control purposes.

This prior art technique illustrated in FIG. 1, along with other known prior art techniques, such as moving an optical element, suffer in that rapid modulation is impractical.

In view of this, it is the object of the present invention to provide an optical chopper which is not so limited as to rate of modulation and, thus, is not limited in its rate of focus dither.

SUMMARY OF THE INVENTION

In order to accomplish this objective, the present invention utilizes a two blade chopper assembly. The openings in the two chopper blades are offset with respect to each other, and one chopper blade is utilized to obtain an ahead of focus edge response function and the other to obtain a behind focus edge response function of an image at high data rates. In the illustrated embodiment, the ahead of focus edge response function corresponds to optical turn-on, while the behind focus edge response function corresponds to turn-off. The blade slot widths are designed to obtain a 50% duty cycle waveform.

Other configurations of the two-blade chopper technique can be utilized in other applications depending on associated requirements. The chopper will be explained by means of an example of its use in a beam angle sensor.

BRIEF DESCRIPTION OF THE DRAWINGS

FIG. 1 is an elevation view of a prior art chopper in which the chopper blade is tilted with respect to the axis of rotation.

FIG. 2 is a front elevation view of the chopper blade arrangement according to the present invention.

FIG. 3 is a cross-section through the arrangement according to FIG. 2.

DETAILED DESCRIPTION OF THE INVENTION

Figure 4:
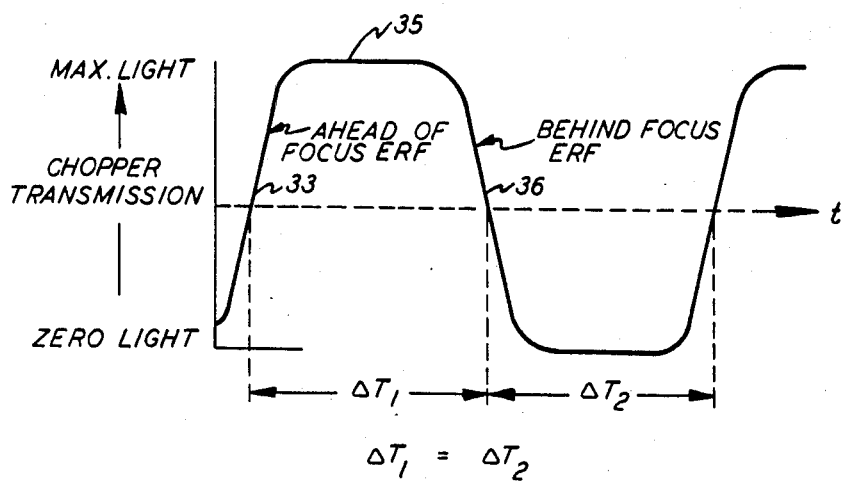
FIG. 4 is a waveform diagram illustrating the output of the arrangement according to FIGS. 2-3.

FIG. 1 is an elevation edge view of a prior art chopper used to obtain focus dither. In this device, a shaft 11 rotates about an axis of rotation parallel to the optical axis. Mounted on a hub 13 on the shaft 11 is a chopper disk 15 containing notches in its periphery. Rather than being perpendicular to the axis of rotation and also parallel to or in the nominal image plane 17, the blade 15 is tilted. Thus, in the position shown, the blade 15 intersects a beam 18 in front of the nominal image plane. When it rotates 180°, as indicated by the dotted line 15', it will intersect the beam behind the nominal image plane. As a result, a sensor placed behind the chopper blade 15 can be utilized to develop a modulated output signal representative of a focus dither. However, the nature of this chopper limits its potential speed of rotation and dither rate.

In single notch chopper implementations, the blade is typically oriented to provide image chopping at the two extreme focus positions as indicated in FIG. 1. The higher dynamic imbalance associated with single notch chopper blades make the use of multiple notch chopper blades more desirable. Such multiple notch chopper blades provide image chopping at intermediate focus positions and do not decrease the time interval between chopping at the extreme focus positions. Hence the focus excursion cycle remains equal to the chopper shaft rotational frequency. This is significant since the attainable bandwidth of, for example, an associated focus sensor is essentially a function of shaft speed rather than the number of chopper notches with the arrangement of FIG. 1.

This basic constraint does not exist with the present invention which offers the highest attainable focus excursion frequency. The present invention offers both better mechanical balance to allow higher shaft speeds and the highest attainable focus excursion frequency, which is equal to the product of shaft rotational frequency times the number of chopper notches. An associated advantage when used in the focus sensor example above is significantly greater attainable focus sensing bandwidth.

FIGS. 2 and 3 illustrate the chopper blade arrangement according to the present invention. In accordance with the present invention, two chopper blades are provided, chopper blade 21 and chopper blade 23. The chopper blades are disposed on opposite sides of the nominal focal plane 25. Rotation of the two blades is in the direction of the arrow 27 at a rotational rate $\omega$. Also illustrated in FIGS. 2 and 3 is the field of view 29 and the image 31 formed by a beam 26 within the field of view 29. Considering the point where the blade 21 is convering the field of view, it can be seen that, with rotation in the direction of the arrow 27, the leading edge of a notch in the blade 21 will begin to uncover the field of view. When it reaches the beam in the field of view it will begin to uncover the beam thus allowing the beam to pass through the notches in blades 21 and 23 to a detector 24. This beam corresponds to the ahead of focus edge response function and is detected by the detector 24 and is illustrated by the rising edge 33 of the waveform of FIG. 4. Once the beam is completely uncovered, the light remains at the maximum level 35 until the blade 23 brings about the behind focus edge response function which corresonds to optical turn-off, i.e., when it begins first to cover the beam in the field of view. This is represented by the trailing edge 36 of the waveform of FIG. 4. FIG. 4 illustrates a 50% duty cycle, i.e. $\Delta T_1 = \Delta T_2$.

Figure 5A:
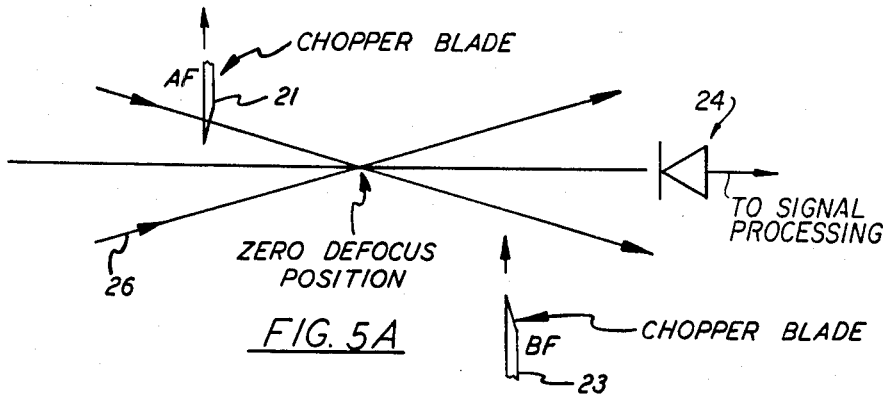
FIGS. 5A-C show operation with zero focus error.
Figure 5B:
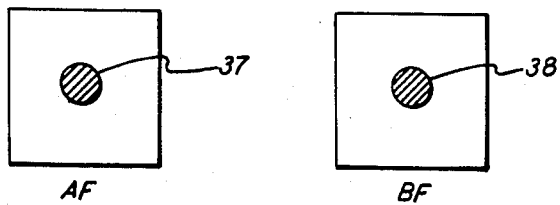
Figure 5C:
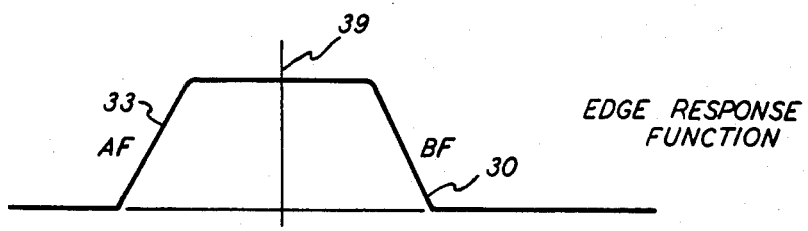

FIGS. 5A–C are helpful in further understanding the operation of the present invention. FIG. 5A shows the ahead and behind focus blades with respect to a properly focused or zero defocused image. The result, if one takes a section through the beam 26 for the ahead of focus (AF) and behind focus (BF) positions, at the chopping planes are as shown in FIG. 5B. In other words, the two cross-sections 37 and 38 are identical. As shown by FIG. 5C, the edge response function is symmetrical about a central axis 39, i.e., it is the same as that of FIG. 2.

Figure 6A:
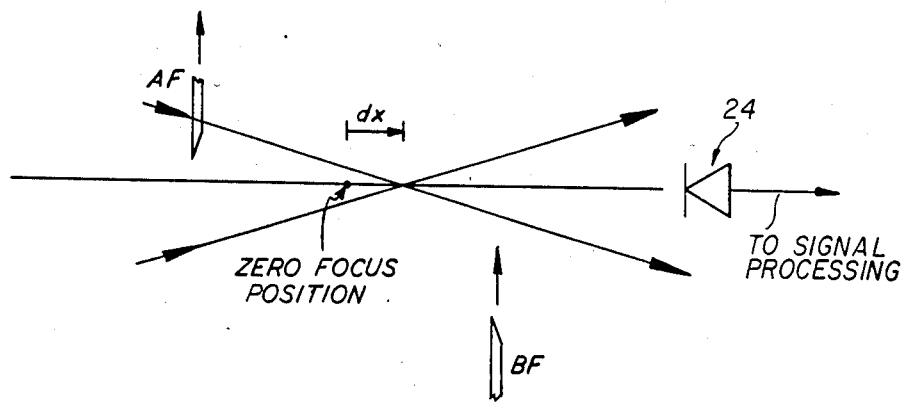
FIGS. 6A-C show operation with focus error.
Figure 6B:
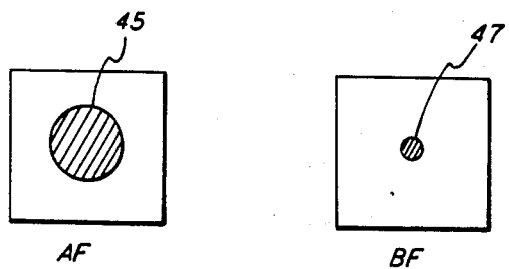
Figure 6C:
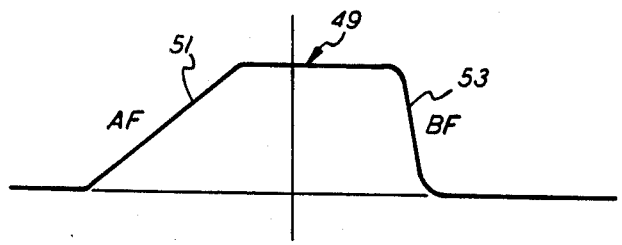

Now, suppose defocus takes place. This is illustrated by FIG. 6. As shown by FIG. 6A, the actual focus is displaced in amount dx from the zero focus position. The result of taking the cross-sections in the ahead of focus and behind focus positions is as shown on FIG. 6B. The ahead of focus cross-section 45 is much wider than the behind focus cross-section 47. The result on the edge response function waveform 49, detected by detector 24 and shown in FIG. 6C, is quite pronounced. The leading edge 51 representing the ahead of focus edge response has a much greater slope than the behind focus edge response 53.

Figure 7A:
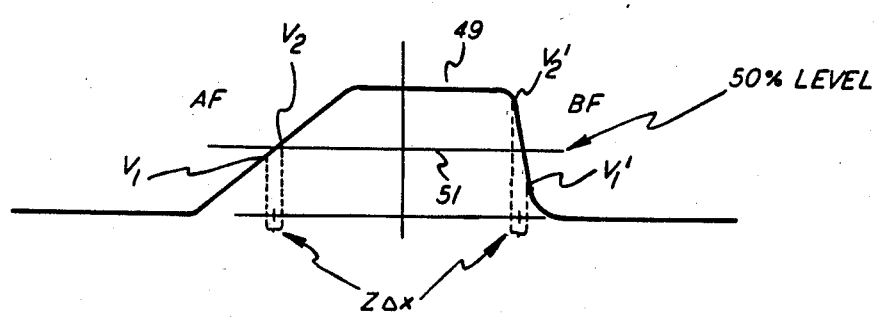
FIGS. 7A and B are waveforms helpful in understanding processing of signals developed by the present invention.
Figure 7B:
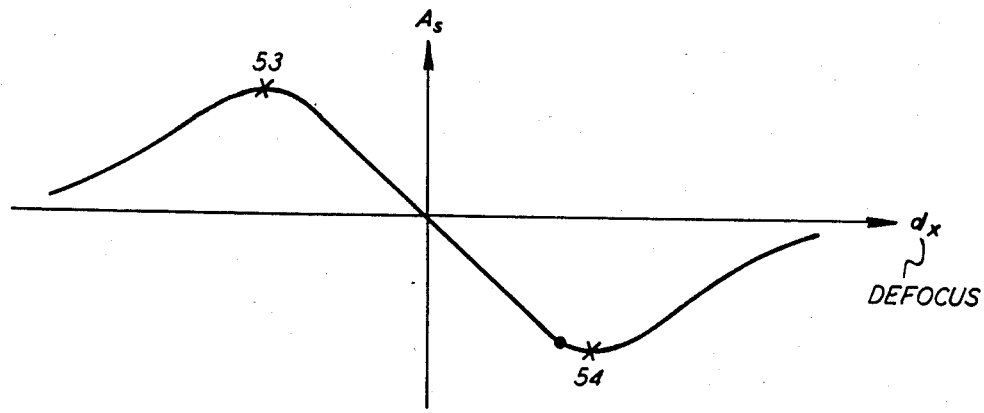

One manner in which this information can be processed is illustrated by FIGS. 7A and B. If one takes the 50% level of waveform 49, i.e., one-half the maximum indicated by line 51 and then takes measurements along the x axis, plus and minus, $\Delta x$ about this point, the resulting outputs will be, as shown, for the ahead of focus response edge, V1 and V2, and for the behind focus edge response V1' and V2'. Note, that the steeper the slope, the larger the difference between the two values will be. The equation $A_s = (V_2 - V_1) - (V_2' - V_1')$ is plotted in FIG. 7B. It is plotted against dx, the defocus. Thus, between the two points 53 and 54 on the plotted curve, there is an essentially linear relationship between $A_s$ and the amount of defocus. The value of $A_s$ is proportional to the amount of defocus and its sign proportional to the direction of defocus. Thus, utilizing the chopper of the present invention, and sensing the output using an appropriate photo-detector, and feeding that waveform to appropriate sampling circuits which can sample and hold voltages on either side of the 50% point, it then becomes possible, using digital or analog circuitry, to solve the equation for $A_s$, determine the amount of defocus and through an appropriate servo-control system adjust an optical element ahead of the chopper to bring the image back into focus. Generally, systems for doing the computations and corrections are well-known in the art and are not described in detail herein. The general nature of the signal processing is given just to aid in an understanding of the benefits to be obtained from the optical chopper of the present invention.

Figure 8:
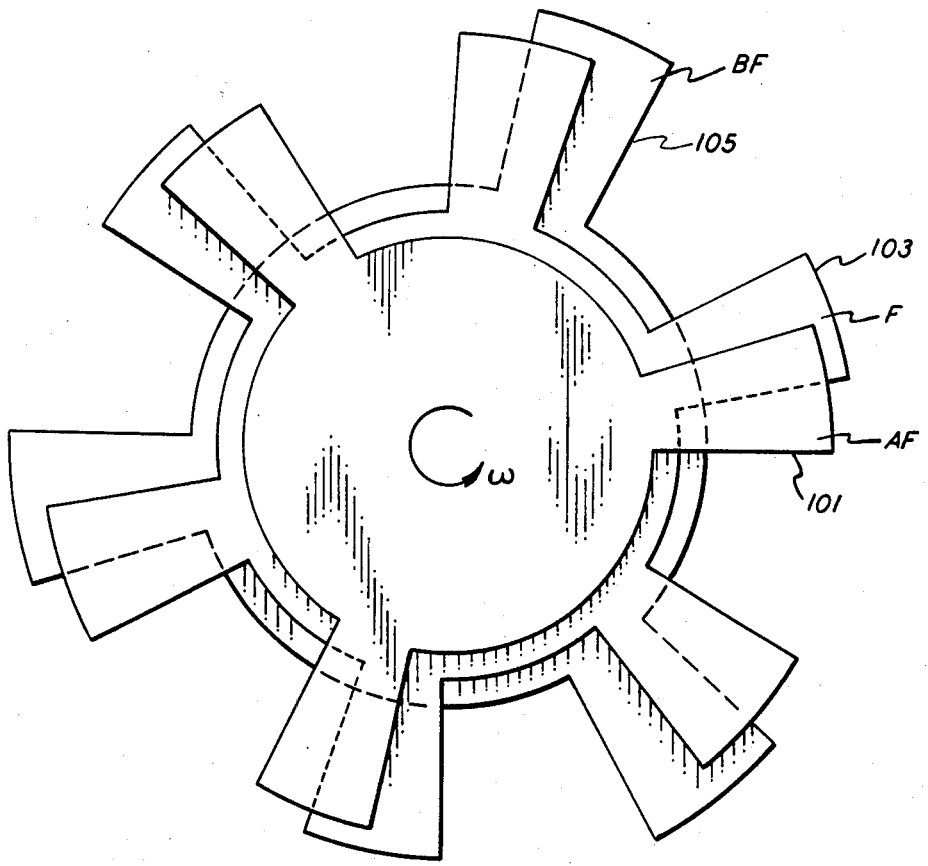
FIG. 8 illustrates an embodiment with three chopper blades.

Other forms of the invention include use of multi-bladed choppers to obtain edge response functions at desired focus positions and in established sequence to accomplish desired ends. FIG. 8 illustrates an arrangement wherein chopping at nominal focus as well as focus extremes is provided. Three blades 101, 103 and 105 are provided. The particular arrangement shown provides the chopping sequence: ahead of focus (AF) with blade 101, at focus (F) with blade 103, behind focus (BF) with blade 105, etc. Other combinations of sequences and chopping positions are readily implementable using the multiblade chopper technique.

What is claimed is:

1. In an optical system with an optical axis in which an image is to be focused at an image plane, an improved chopper which can be driven at a high rate and use multi-notch choppers for obtaining dither about the focal point in said system comprising, first and second chopper blades, each having at least one notch in their periphery, said notches in said first and second chopper blades being fixed in rotationally offset position with respect to each other, said chopper blades mounted to a common shaft adapted for rotation, said blades disposed parallel to each other and essentially perpendicular to the optical axis, said blades disposed on opposite sides of the image plane, one of said blades providing an ahead of focus edge response and the other of said blades a behind focus edge response, means for sensing said ahead of focus edge response and a behind focus edge response and providing an output respresentative of the out of focus condition of said image at said image plane.

2. The chopper according to claim 1 wherein said first and second blades each contain a plurality of notches.

3. Apparatus according to claim 2, wherein the blades are rotated in a direction such that the ahead of focus edge response function corresponds to optical turn-on, while the behind focus corresponds to optical turn-off.

4. Apparatus according to claim 3 wherein said blade notch widths are selected to obtain a 50% duty cycle waveform.

5. Apparatus according to claim 1 or 2 wherein said blade slot widths are selected to obtain a 50% duty cycle waveform.

6. Apparatus according to claim 1 or 2 and further including at least one additional blade at a different focus position whereby a desired sequence of chopping at specific focus positions can be obtained.

* * * * *